May 29, 1934.  E. C. WALKER  1,960,282
FAN AND WATER PUMP ASSEMBLY
Filed Dec. 18, 1931
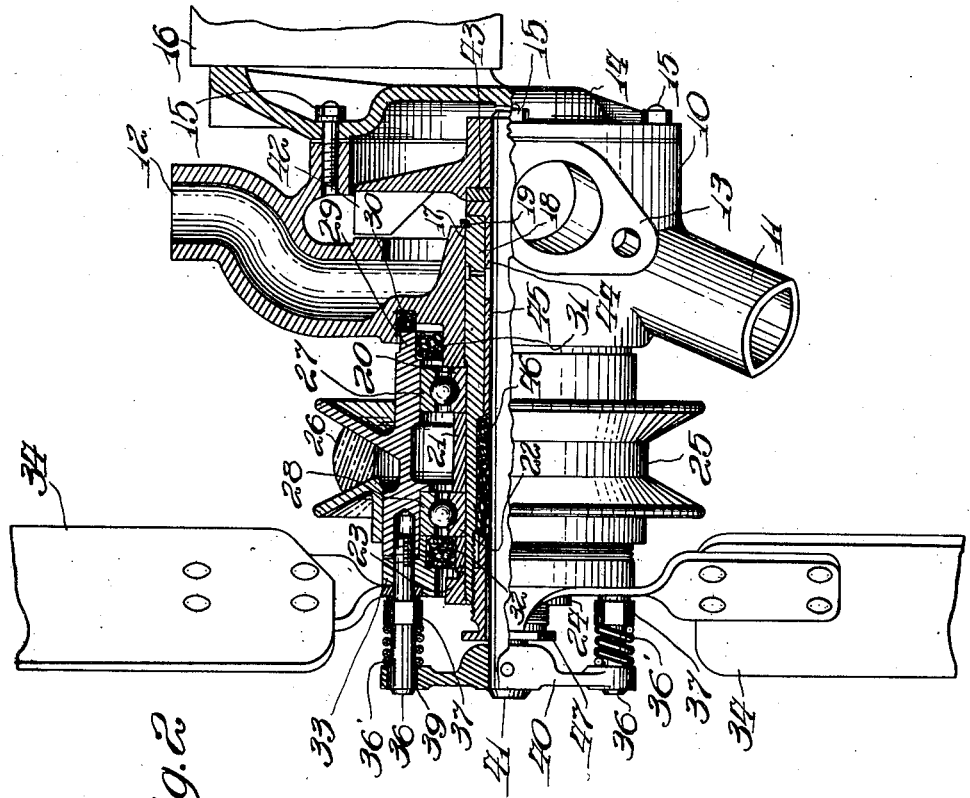
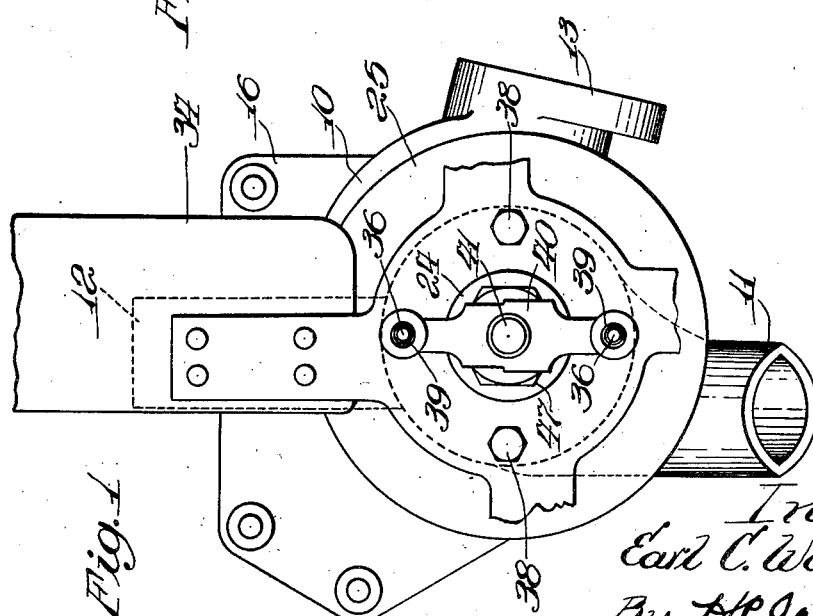
Inventor
Earl C. Walker Patented May 29, 1934

1,960,282

UNITED STATES PATENT OFFICE 1,960,282

FAN AND WATER PUMP ASSEMBLY

Earl C. Walker, Chicago, Ill., assignor to International Harvester Company, a corporation of New Jersey Application December 18, 1931, Serial No. 581,832

2 Claims. (Cl. 103—111)

This invention relates to a fan and water pump assembly for internal-combustion engines.

The principal object of the invention is to provide an improved water pump construction for a cooling system of an internal-combustion engine.

A more specific object is to provide a pump, which is packed against leakage, and with a driving means for said pump mounted in such a manner that it transmits only torque to the rotating members of said pump.

Another object is to incorporate a cooling fan in combination with the pump and the driving means therefor, so arranged that any leakage of water from the pump shaft cannot enter the bearings of the driving member.

The above objects, and others which will be apparent from the following detailed description, are accomplished by the construction shown in the drawing, in which:

Figure 1 is an end view of an embodiment of the invention, including the means by which the device is attached to an internal-combustion engine; and Figure 2 is a side elevation, partly in section, to better show the elements making up the device.

In the embodiment of the invention illustrated a particularly designed casting 10 is formed with an inlet 11 for receiving water from the radiator of the cooling system and an inlet 12 for receiving water from a bypass. This construction is utilized when thermostatic control of the engine is employed and is well known in the prior art. An outlet 13 from the casting 10 provides for the discharge of water from the pump and is to be connected to the block of the engine in the usual manner. Insofar as the present invention is concerned, the casting 10 constitutes a housing for the water pump and a support for the driving means for said pump and will hereinafter be designated as the pump casing.

A cover plate 14 is secured to the pump casing 10 by bolts 15 and a suitable gasket to secure a fluid-tight connection. The plate 14 is provided with means, as shown in Figure 1, for securing it to the block 16 of an engine.

On the side of the casing 10 opposite the cover 14, an opening is provided in the form of a bore 17 having a substantial bearing surface formed in the direction of its axis by annular flanges formed integrally with the casing 10. A sleeve 18 annular in cross section, is fitted into the bore 17. Said sleeve extends within the casing and is provided at its inner end with an annular recess in which a locking ring 19 is seated. Said ring fits against the inside end of the inwardly extending annular flange on the casing 10 and secures said sleeve against sliding movement in an outward direction. The sleeve is tightly fitted in the bore to prevent its rotation with respect thereto. The sleeve is also fitted in a fluid-tight manner with respect to the bore to prevent the escape of water therebetween.

On the sleeve 18, outside the casing 10 and against the end of the outwardly extending annular flange on the casing, a ball bearing race 20 is fitted. An annular spacer 21 is fitted against said race and a second ball bearing race 22 is fitted against said spacer. A second spacer ring 23 is fitted against the outer side of the race 22 and a nut 24 is threaded on the sleeve 18, whereby the ball races are accurately and permanently held in position. A belt pulley 25, shaped to be driven by a wedge-shaped belt 26, as illustrated in the cross sectional part of Figure 2, is rotatably mounted on the sleeve 18. Ball races 27 and 28, mounted internally of the belt pulley, are positioned in alignment with the races 20 and 22. Balls cooperate with the two races to form a bearing adapted to take both axial and radial thrust.

At its inner end the belt pulley 25 is formed with a flange 29, shaped to engage an oil seal element 30. Said element also engages the outer cylindrical surface of the outwardly extending flange on the casing 10. A second oil seal element 31 is shown mounted between the end of the belt pulley and the casing. At the other end of the belt pulley an oil seal element 32 cooperatively engages the spacer ring 23 and an annular member 33 secured to the pump casing, as will be hereinafter described. It is to be understood that the oil seals shown are merely illustrative of one type of seal and that any effective type of oil seal may be utilized.

The member 33 is provided with a flange fitting internally of a flange on the pulley 25 and a plurality of openings aligned with bores of the same diameter formed in the pulley. A fan 34 having a plurality of blades and a substantially circular center plate to which the blades are attached, also has openings aligned with the openings in the member 33. Elements 36 extend through two diametrically positioned openings in the fan and in the member 33 and are threaded into the corresponding bores formed in the belt pulley. A hexagonal portion 37 is formed on said elements to provide means for tightening the fan and the member 33 securely in position with respect to the belt pulley. Two cap screws 38, as shown in Figure 1, extend through the fan and through the member 33 and are also threaded into the pulley.

The elements 36 have outwardly extending cylindrical portions beyond the hexagonal portion 37. Said portions slidably and freely extend through bores 39 formed in a pump driver member 40. Compression springs 36' are positioned around the outer cylindrical portions of the elements 36 and abut against the hexagonal portion 37 of said elements and against the member 40 around the bores 39 formed therein.

The member 40 is rigidly keyed to a pump shaft 41. Said shaft extends through the sleeve 18 to the interior of the pump casing. An impeller 42 of a conventional type is fixed to the shaft within the casing for rotation therewith. A thrust washer 43 is mounted in a recess formed on the outer face of the impeller hub. A shaft bushing 44, consisting of an annular sleeve portion surrounding the shaft and extending into the sleeve 18, is also provided with a thrust flange positioned between the thrust washer 43 and the inner end of the sleeve 18. Another shaft bushing 45 is also mounted within the sleeve 18 intermediate its ends, to form an additional bearing for the shaft 41.

A portion of the sleeve 18 at its outer end, is cut away internally to form an annular space of increased diameter between the sleeve and the shaft 41. Packing material 46 is fitted into this space. A packing gland 47 is threaded into the end of the sleeve 18 and abuts the packing, whereby pressure may be applied thereto.

As previously mentioned, the plate 14 is secured to the engine block in the conventional position at the forward end thereof. The casing 10 is rigidly secured to the plate 14 and is adapted to be connected to the sources of water supply and discharge by means of the conventional couplings connected to the inlets 11 and 12 and the discharge outlet 13. The inlet 11, as well as the inlet 12, opens into the center of the impeller 42. The discharge outlet 13 leads from the passage surrounding the outer portion of the impeller. This construction is well known in the prior art and does not form a part of this invention. The thrust washer 43 rotates with the impeller 42 and its shaft 41 and engages the thrust flange of the sleeve 44, which is rigidly mounted with respect to the sleeve 18. The bearing surface between the faces of said thrust elements provides a water seal and a wearing surface. However, should any water leak through the seal formed by said elements, the packing 46 is provided as an absolute water seal. The packing gland 47 is adjustable to compress the packing 46 to take up for wear and prevent leakage.

It will be understood from the construction shown that some means will be necessary to maintain engagement and pressure between the thrust elements above referred to. This means includes the compression springs 36', which press outwardly against the driving member 40, thereby maintaining the thrust elements in engagement. The elements 36, on which the springs are mounted, also serve as driving means for rotating the pump impeller with the fan. The pulley 25, as previously described, is mounted for rotation on the sleeve 18 and the bearings provided are of the type designed to take axial thrust as well as the radial load. Said pulley, therefore, takes the reaction from the spring 36'. The elements 36, which are secured to the pulley, in addition to holding the fan, also provide, by their cylindrical extensions, means for driving the pump shaft and impeller.

The bores 39 through which the elements 36 extend in the member 40, are slightly larger than the elements 36 to prevent any vibration or strain other than the driving torque from being applied to the pump shaft.

By the construction illustrated and described, a reliable water seal is provided. Moreover, any water which escapes cannot in any way affect the operation of the fan bearings as the bearings and the seals therefor are entirely independent from the water seal and packing of the pump shaft. It is to be noted that pressure applied to maintain the thrust elements 43 and 44 in contact is dependent upon the strength of the springs 36' and may be regulated by altering the strength of the springs.

It is to be noted that by the construction of the invention the pulley and the fan which might be accurately balanced prior to assembly, are mounted on the spaced ball bearings entirely independent from the pump shaft and are carried by a rigid support, the sleeve 18. The connections between the fan hub assembly and the pump drive shaft are such that no vibration or strains are transmitted from the rotating fan assembly to the pump shaft, only the torque required for rotation of the pump shaft being delivered thereto.

In this construction there is no necessity for obtaining accurate axial alignment or concentricity of the pump shaft with the fan pulley although the two elements rotate on the same axis. It is understood that the fan may be omitted from the assembly and that the device may be used as a water pump alone.

It is to be understood that applicant has shown and described only a preferred embodiment of his improved fan and water pump assembly and that he claims as his invention all modifications falling within the scope of the appended claims.

What is claimed is:

1. A fan and water pump assembly comprising a casing, an inlet thereto and a discharge outlet therefrom a hollow sleeve extending from said casing, a fan assembly mounted on said sleeve for rotation with respect thereto and held against axial movement with respect thereto, a floating pump shaft extending through said sleeve and mounted for rotation co-axially with the fan assembly, an impeller mounted on the shaft within the casing, a driving member mounted rigidly at the outer end of the shaft and extending radially therefrom, driving elements projecting axially from the fan assembly, said driving elements being diametrically positioned on the fan assembly and said driving member being formed with openings aligned with the driving elements into which said driving elements extend whereby driving torque may be transmitted in either direction, and compression springs mounted adjacent the driving elements and positioned to abut the fan assembly and the driving member whereby said member is resiliently held against axial movement.

2. A fan and water pump assembly comprising a casing, an inlet thereto and a discharge outlet therefrom, a hollow sleeve extending from the casing, a fan assembly mounted on said sleeve for rotation with respect thereto, said assembly including a drive pulley and a fan secured to said pulley by threaded members having portions extending outwardly beyond the fan, a floating pump shaft extending through the sleeve and mounted for rotation co-axially with the fan assembly, an impeller mounted on the shaft within the casing, a driving member mounted rigidly at the outer end of the shaft, said member having radially extending portions engageable by the outwardly extending portions of the fan securing members, the radially extending portions of said driving member being formed with openings through which said outwardly extending portions of the securing members extend, and compression springs surrounding the securing members and exerting pressure against the driving member and the fan assembly.

EARL C. WALKER.